March 31, 1931.   W. C. MORAN   1,798,949
LEVER SYSTEM FOR TESTING MACHINES
Filed July 21, 1928   6 Sheets-Sheet 1

INVENTOR.
WILLIAM C. MORAN,
BY
ATTORNEYS.

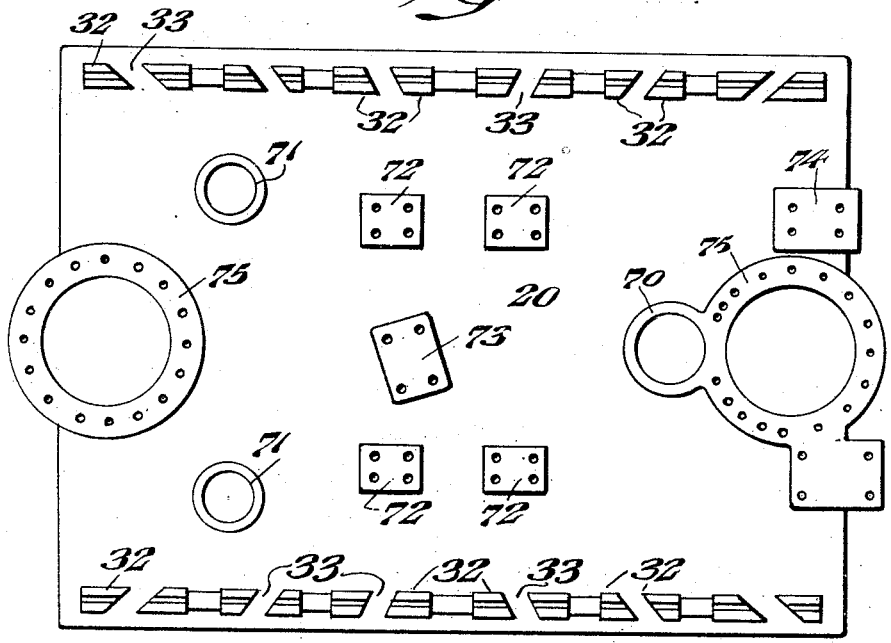
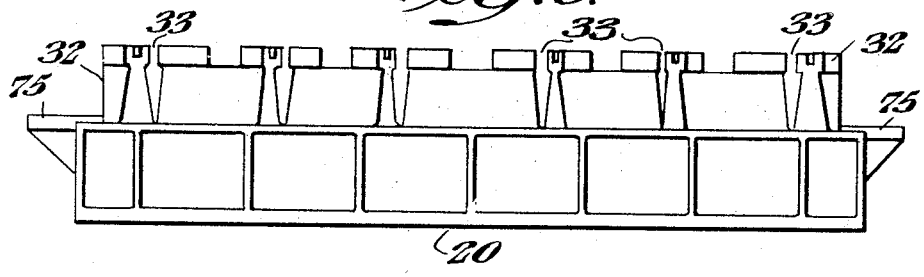

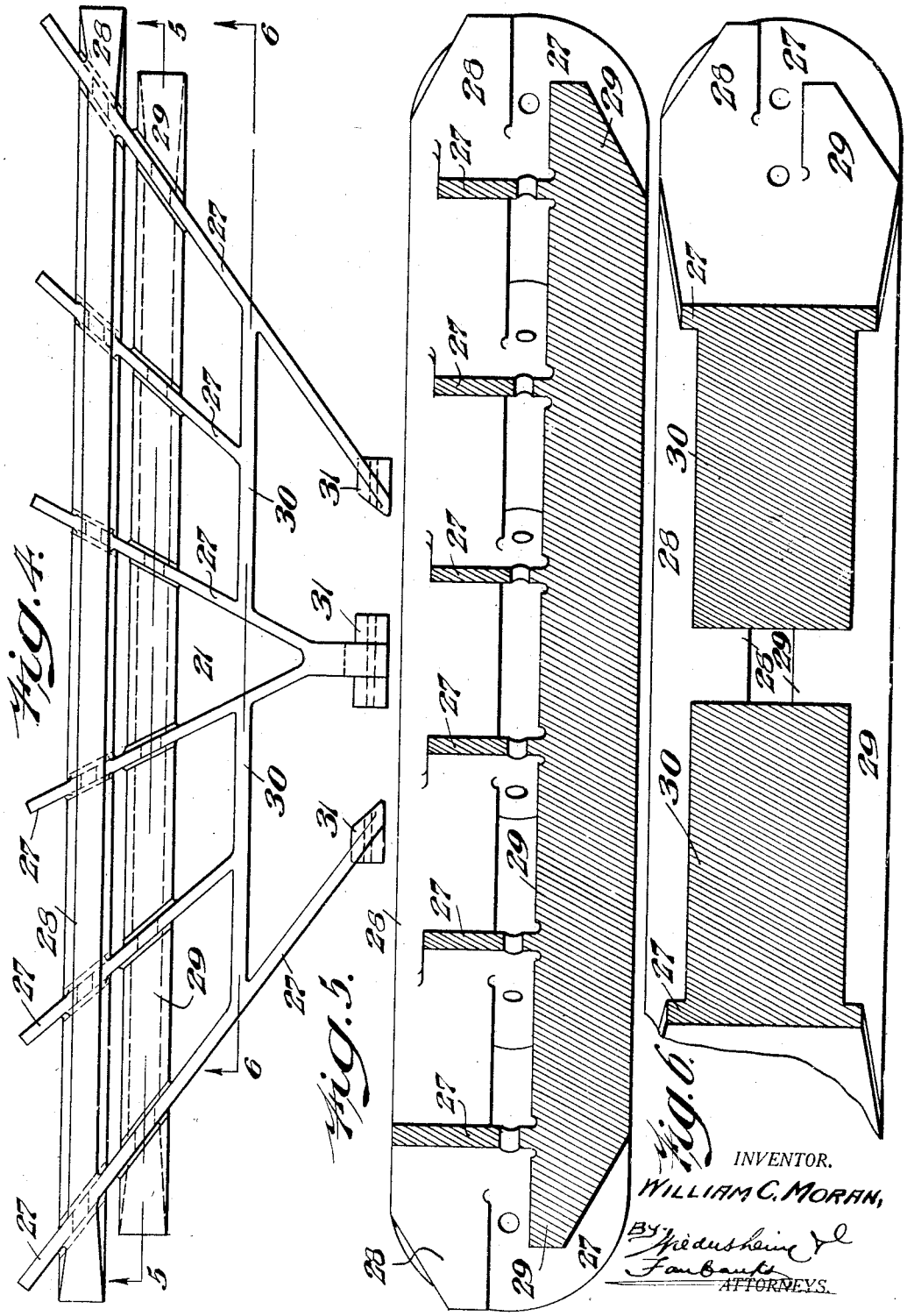

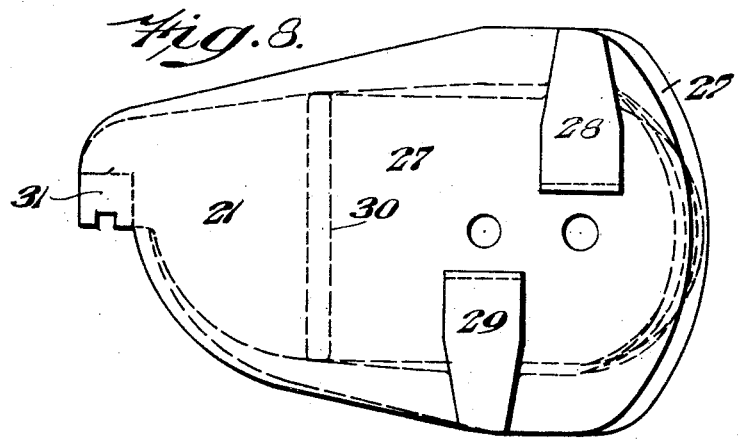
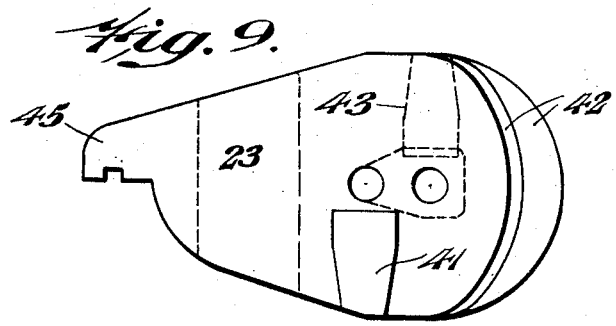
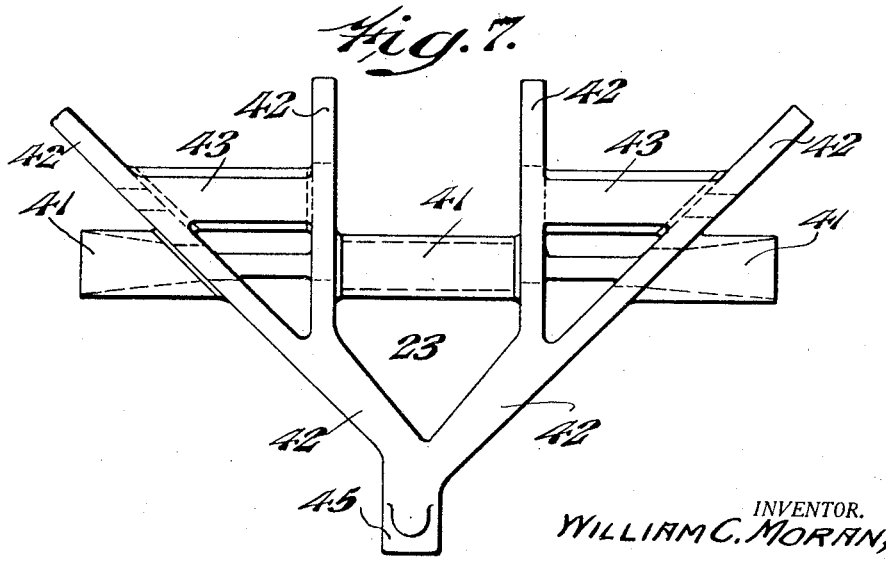

March 31, 1931.  W. C. MORAN  1,798,949
LEVER SYSTEM FOR TESTING MACHINES
Filed July 21, 1928  6 Sheets-Sheet 5
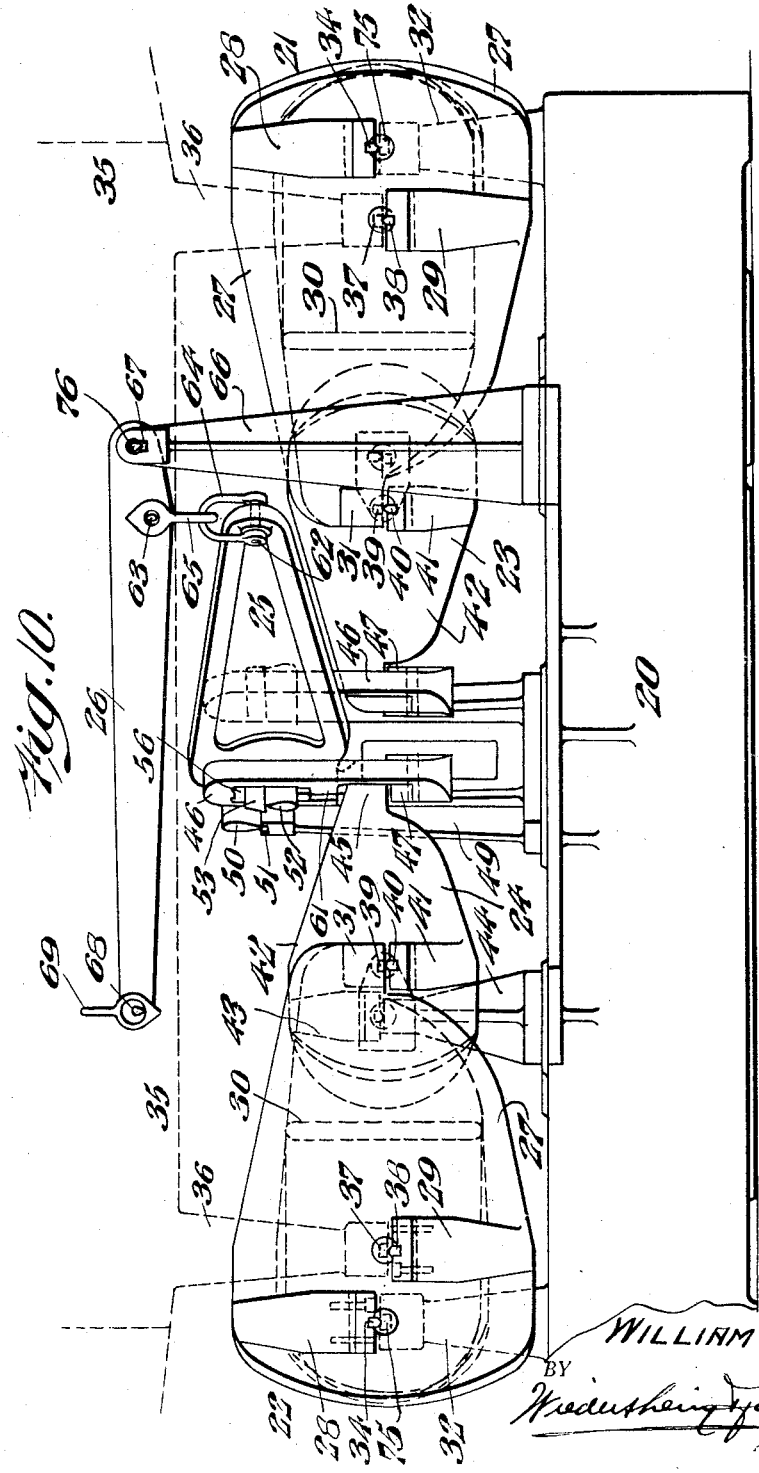
INVENTOR.
WILLIAM C. MORAN,
BY
ATTORNEYS.

March 31, 1931.  W. C. MORAN  1,798,949
LEVER SYSTEM FOR TESTING MACHINES
Filed July 21, 1928   6 Sheets-Sheet 6
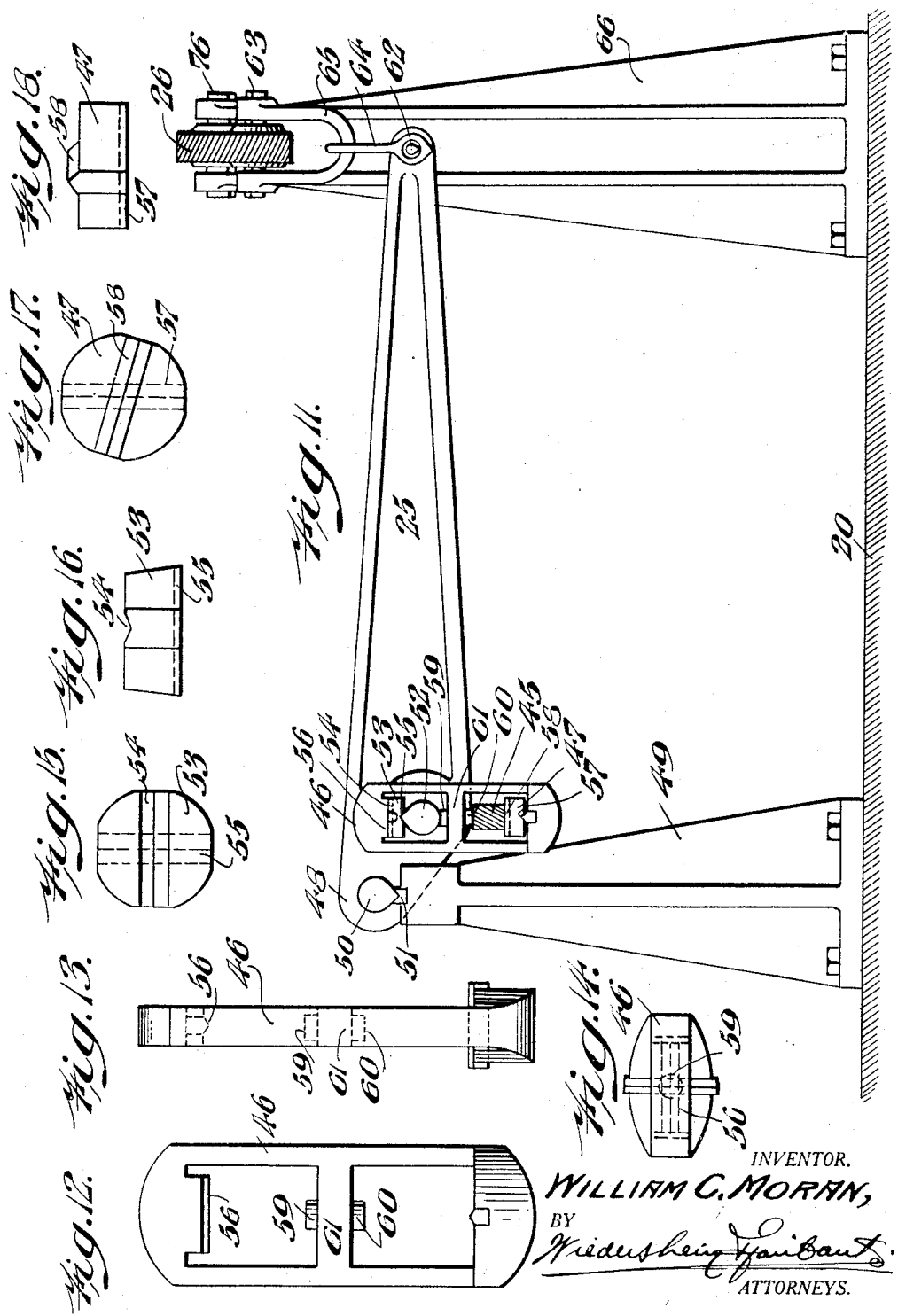
INVENTOR.
WILLIAM C. MORAN,
BY
ATTORNEYS.

Patented Mar. 31, 1931

1,798,949

UNITED STATES PATENT OFFICE

WILLIAM C. MORAN, OF LAUREL SPRINGS, NEW JERSEY, ASSIGNOR TO RIEHLE BROS. TESTING MACHINE CO., OF PHILADELPHIA, PENNSYLVANIA, A CORPORATION OF PENNSYLVANIA

LEVER SYSTEM FOR TESTING MACHINES

Application filed July 21, 1928. Serial No. 294,404.

My invention relates to a new and useful improvement in testing machines and it relates more particularly to a novel compound lever weighing system which will minimize, if not entirely eliminate, certain inaccuracies and disadvantages inherent in the weighing systems employed heretofore on testing machines, particularly the machines of large capacity.

The mechanically weighing compression and tension testing machines employed heretofore have been provided with a lower weighing table which acts as one of the two specimen supports and which is supported at its four corners on a pair of levers of unequal lengths, the free ends of which extend a considerable distance beyond the table on one side thereof.

Each of the pair of main weighing levers was then connected to a common series of levers which terminated in the weighing means.

The inherent disadvantage of the weighing system was that the main levers which bore the direct, and hence the greatest load of the test, were not only of relatively great length since they directly transmitted the force to be weighed to a point a considerable distance from one side of the table, but said main levers were also necessarily of substantially unequal lengths because, while the free ends of said levers terminated at the same point to one side of the machine, yet one lever extended beneath and carried the two near corners of the table while the other levers extended beneath and carried the two far corners of the table. Due to the necessarily great length of the main levers they were subject to undue deflection particularly under extremely high loads and hence the machine as a whole was subject to a very great and undesirable recoil at the instant of rupture or failure of the specimen. This recoil occasioned by the undue deflection of the main levers under extreme loads not only had a tendency to dislodge the many pivotal supports but also in many instances had a tendency to crack and break the knife edges or other pivotal supports.

Due to the unequal length of the main levers, moreover, the deflection or bending of said main levers under extremely high loads would likewise be unequal with the result that the weighing table would be tilted slightly downwardly on the side carried by the longer lever and hence the force to which the specimen would be subjected was not in true alignment.

The object of my present invention is to eliminate these disadvantages and inaccuracies inherent in lever type testing machines employed heretofore, by a novel construction which will not only permit an accurate equalization of the main levers but which will also permit a shortening of the main levers to a very considerable extent, thereby not only reducing the deflection of the main levers to a minimum but also preventing any tilting of the weighing table due to any unequal deflection of the main weighing levers.

With the above objects in view my invention consists of a testing machine in which the main levers, both primary main levers and secondary main levers, are positioned entirely beneath the table, do not extend beyond the same and are of equal lengths.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings, in which like reference characters indicate like parts:

Figure 2 represents a top plan view of the cover plate of the gear box or housing (drawn approximately two-thirds the size of Figure 1), with the levers removed therefrom.

Figure 3 represents a side elevation of the cover plate shown in Figure 2.

Figure 4 represents a top plan view of one of the primary main levers detached and on an enlarged scale.

Figure 5 represents a section on line 5—5 of Figure 4.

Figure 6 represents a section on line 6—6 of Figure 4.

Figure 7 represents a top plan view of one of the secondary main levers detached and on an enlarged scale.

Figure 8 represents a side elevation, on an enlarged scale, of one of the primary main levers.

Figure 9 represents a side elevation, on an enlarged scale, of the secondary main levers.

Figure 10 represents a side elevation of my novel weighing system, on an enlarged scale, viewed on line 10—10 of Figure 1.

Figure 11 represents a side elevation of the intermediate weighing levers viewed on line 11—11 of Figure 1.

Figure 12 represents a front elevation of one of the clevises or suspension cradles of the universal rocking joint between the main lever system and the intermediate lever system.

Figure 13 represents a side elevation of the same.

Figure 14 represents a top plan view of the same.

Figure 15 represents a top plan view of the upper loose pivot block carried within the upper part of the clevis.

Figure 16 represents a side elevation of the same.

Figure 17 represents a top plan view of the lower loose pivot block carried within the lower part of the clevis of Figure 12.

Figure 18 represents a side elevation of the same.

Figure 1:
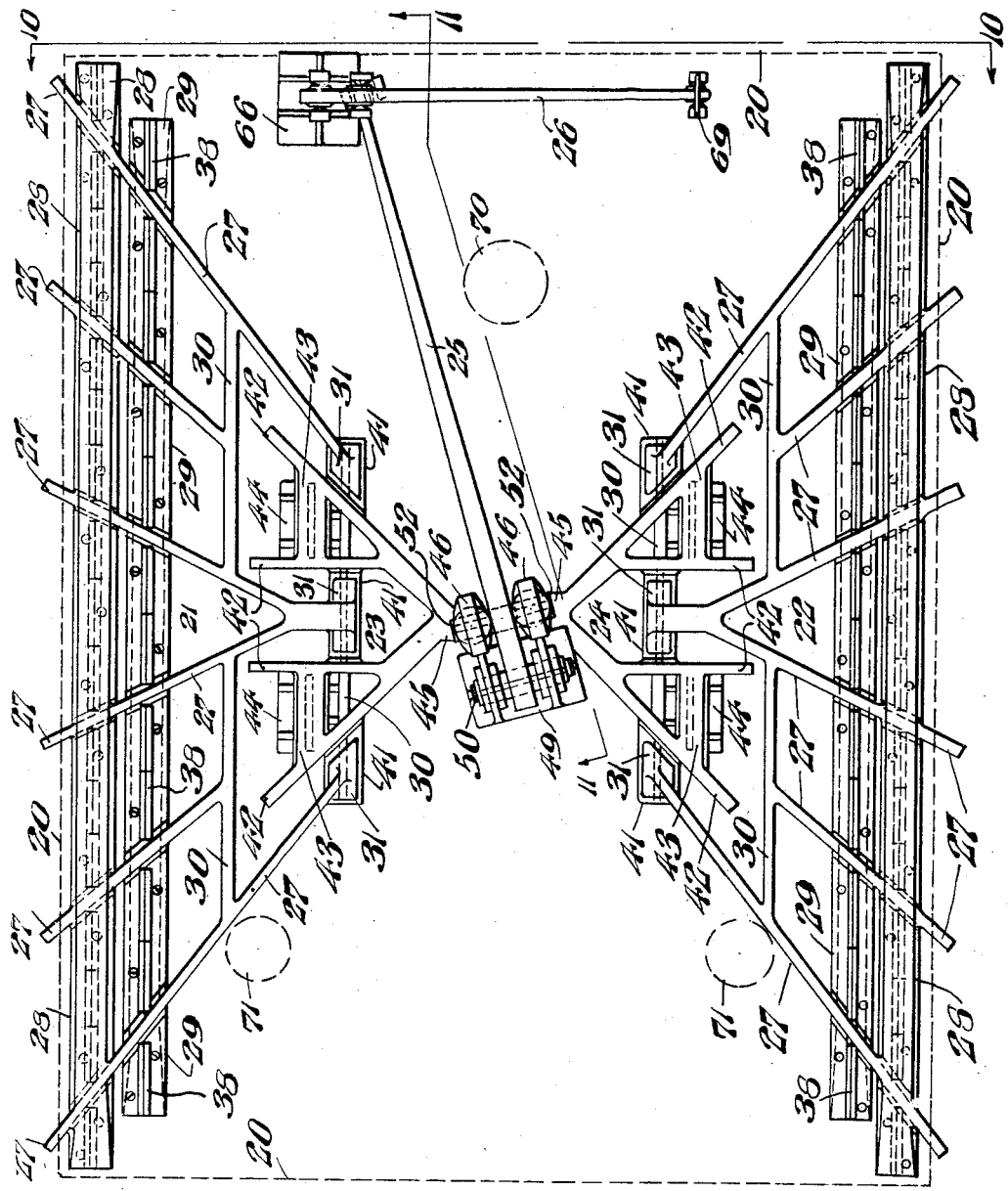
Figure 1 represents a top plan view of my novel weighing system for testing machines (with the table removed therefrom).

The novel lever system of my invention is shown in a plan assembly view in Figure 1, in which figure the outer dotted line 20 represents the upper cover plate of the gear box or housing upon which the lever system is supported. The table or weighing platform of the machine is not shown in Figure 1 but is disposed directly above and is carried by the levers shown in Figure 1 and said table covers the entire lever system.

My novel lever system comprises:—

(a) A pair of similar and opposed primary main levers 21 and 22 which directly carry the weighing platform or table along its two opposed parallel edges and which extend inwardly in opposite directions towards each other and towards the center of thrust or the center of load of the table.

(b) A pair of similar and opposed secondary main levers 23 and 24 which in turn carry the inner ends of the primary main levers 21 and 22, respectively.

(c) The single primary intermediate lever 25, which is disposed at an acute angle to the pivot lines of the primary and secondary main levers, carries each of the inner ends of the pair of secondary main levers 23 and 24, through a universal rocking joint, preferably having its vertical center line coincident with the vertical center line of the table and composed of a pair of similar clevises or suspension cradles on either side of the lever 25.

(d) A single secondary intermediate lever 26, disposed at a right angle to the pivot lines of the primary and secondary main levers and disposed at an acute angle to the primary intermediate lever 25, carries the outer end of the latter also through a universal suspension joint.

The secondary intermediate lever 26 is connected through a suitable vertical link to any conventional weighing beam positioned above, though not shown in the drawings.

Each of the series of levers may be proportioned according to any suitable ratio, depending upon the desired size and capacity and other factors of the testing machine. Each pair of levers or each single lever in turn reduces the force of the test load according to the predetermined ratio of the lever so that the ultimate force at the outer end of the secondary intermediate lever 26 is a suitable and predetermined fraction of the direct test load exerted upon the primary main levers 21 and 22.

The primary main levers 21 and 22 each comprise a series of relatively deep convergent beams 27 and transverse shoulder members 28 and 29 and a transverse web 30, all formed integrally with each other so as to constitute a single lever having relatively great width and relatively small length and great rigidity and resistance to deflection.

In order to provide knife edge support commensurate with and proportionate to the load upon the pivot, the pivot shoulders 28, 29 and 31 are made of varying lengths and may be made the entire length of the table, if so desired.

The levers 21 and 22 are fulcrumed upon a series of aligned stationary pedestals 32, disposed along each of the two opposed edges of the cover plate and extending parallel to each other, as shown particularly in Figure 2.

The sets of aligned pedestals 32 correspond to the pivot shoulders 28 of the primary main levers 21 and 22, respectively, with suitable spaces 33 therebetween to accommodate the beam members 27. The fulcrum pedestals 32 are provided with corresponding series of suitable aligned bearing blocks 75 having an obtuse interior angle, while the shoulders 28 of each of the primary main levers 21 and 22 are provided with a corresponding series of aligned knife edge bearings 34 which are adapted to rest in the bearing blocks 75, thereby providing the stationary pivotal support for the primary main levers.

The table 35, indicated in dotted lines in

Figure 10 particularly, is provided with sets of aligned downwardly depending pivot pedestals 36; one set along each of the opposed parallel edges of the table, upon which said table is carried. The pivot pedestals 36 of the table 35 in turn carry bearing blocks 37 which rest upon corresponding knife edged pivots 38 carried by the shoulder 29 of the levers 21 and 22.

The shoulders 31 at the inner ends of the levers 21 and 22 in turn carry bearing blocks 39 which rest upon and thus transmit the test load to a series of pivots 40 carried by the shoulders 41 of the secondary main levers 23 and 24 (Figures 7, 9 and 10).

The secondary main levers 23 and 24, like the primary main levers 21 and 22, each comprise series of relatively deep, convergent beams 42 and the transverse shoulders 41 and 43 formed integrally with each other so as to constitute a single relatively short and wide lever of great rigidity. The secondary main levers 23 and 24 are fulcrumed also at their outer ends upon pairs of aligned fulcrum pedestals 44 carried by the cover plate 20. The pivot pedestals 44 are provided with bearing blocks while the shoulders 43 of the levers 23 and 24 are provided with the knife edge pivots.

The inner ends of the secondary main levers 23 and 24 terminate in single shoulders 45 (see Figures 7 and 11) provided with downward or inverted bearing blocks. Each of the shoulders 45 of the levers 23 and 24 extends into corresponding opposed clevises 46 and rests upon movable or loose pivot bearing blocks 47 (Figures 17 and 18).

The primary intermediate lever 25 is pivoted at its inner end 48 upon the fulcrum block 49, by means of the knife edge pivot 50 resting upon the bearing block 51, as shown particularly in Figures 1, 10 and 11. The pivot 52 extends through and a considerable distance beyond each side of the lever 25 and is provided with upper knife edges. A universal clevis or suspension yoke 46 is suspended from each of the knife edges of the pivot 52 on either side of the lever 25, also as will appear particularly in Figures 1, 10 and 11. A movable or loose pivot bearing block 53 (Figures 15 and 16) having two opposed and right angularly disposed obtuse angular seats 54 and 55, is interposed between the knife edges of the pivot 52 and upper knife edge pivots 56 carried by each of the two universal clevises 46. By this means the clevises or suspension yokes 46 are capable of universal angularity with respect to the lever 25, within suitable small limits.

The lower movable or loose pivot bearing blocks 47, which are operatively interposed between the terminal shoulders 45 of the secondary main levers 23 and 24 and the pair of universal clevises 46, are in turn provided with juxtaposed bearing seats 57 and pivots 58, inclined with respect to each other, corresponding to the inclination of the lever 25 with respect to the pivot lines of the primary and secondary main levers. By this means the force from the main levers 21 and 22 and 23 and 24 may be accurately transmitted to the single primary intermediate lever 25 without any material decrease or loss of sensitivity.

The lugs 59 and 60 carried by the transverse bar 61 of the clevises 46 serve as stops to prevent the dislodgement of the pivots from their seats in the upper and lower parts of the clevises 46.

The primary intermediate lever 25 is so positioned that the vertical center line of the universal joint between said primary intermediate lever and the two pivot shoulders 45 of the secondary main levers 23 and 24 is coincident with the load center of the table of the testing machine, that is, coincident with the line on which the force is exerted upon said table. Thus the table is evenly supported by a pair of primary main and a pair of secondary main levers which are not only equal in length and uniform in size, but which are also uniformly loaded or balanced transversely, since both the primary as well as the secondary main levers extend inwardly towards each other along the transverse center of the table. The outer end of the primary intermediate lever 25 is in turn connected with the secondary intermediate lever 26 (Figures 1, 10 and 11) by means of a universal suspension joint comprising the pivots 62 and 63 carried by the primary and secondary intermediate levers, respectively, and corresponding U-shaped interlinked yokes 64 and 65, respectively.

The secondary intermediate lever 26 carries a pivot 76 and is fulcrumed upon the pedestal 66, also carried upon the cover plate 20 and having pivot seats or blocks 67 at its upper end. The outer end of the secondary intermdiate lever 26 in turn carries the pivot 68 which rests in a suitable suspension link 69, which latter extends upwardly and connects with any conventional weighing beam (not shown in the drawing).

The openings 70 and 71, indicated in dotted lines in Figure 1 and shown full in Figure 2, are the openings in the cover plate through which the load screws extend. In the particular construction illustrated in the drawings, three load screws are employed of the general type and construction disclosed in my prior Patent No. 1,573,521 although my novel lever system is equally applicable to two and four screw machines of the conventional type used heretofore. The pads 72 on the cover plate 20, shown in Figure 2, are adapted to receive the fulcrum pedestals 44, while the pad 73 is adapted to receive the fulcrum pedestal 49. Similarly the pad 74 on the cover plate 20 is adapted to receive the fulcrum pedestal 66.

My novel construction described hereinabove in a lever system for testing machines is applicable to testing machines of any size or capacity. The novel lever system of my invention, however, is of particular advantage in testing machines of large size or capacity, as for instance, testing machines measuring compression or tensional strengths of between a million and two million pounds, or upwards of two hundred thousand pounds.

It is particularly in measurement of such extremely great forces that the inaccuracies and disadvantages inherent in the lever systems employed heretofore are accentuated.

In lever systems employed heretofore the pivot lines of the main levers were disposed at a right angle to the direction in which the load was finally transmitted from the center of the table to the weighing beam, and the main levers were usually disposed generally in the direction of or parallel to the direction in which the load was transmitted from the center of the table to the weighing beam.

It will be observed that in my novel lever system the pivotal lines of the main levers (both primary and secondary) extend generally parallel to the direction in which the load is transmitted from the center of the table to the weighing beam and the main levers extend generally at the right angle to such direction instead of parallel thereto as has been the practice heretofore.

Likewise the main levers of my novel lever system are disposed entirely central with respect to the table and do not extend to one side of the table or "off center" as has been the practice heretofore.

The advantages of this novel construction and my novel lever system are manifold. First, the main levers which must be provided in pairs in order to provide an equalizing or balanced support for the table are similar, are of equal lengths and are centrally disposed with respect to the table. The main levers, moreover, which are subjected to the greatest load, may be made relatively short as compared to the main levers of the constructions employed heretofore and hence subject to much less deflection under extreme loads.

It will also be observed that in my novel lever system the load is not transmitted from the center of the table into alignment with the weighing beam until the force has been many times reduced through the primary and secondary main levers, whereas in the lever systems employed heretofore the primary main levers carry the initial load directly off the center of the table to some point remote from the center of the table to the weighing beam either directly or through intermediate levers.

Having thus described my invention what I claim as new and desire to secure by Letters Patent, is:—

1. In a testing machine, a pair of similar and opposed pivotally mounted primary main weighing levers extending inwardly in opposite directions toward each other, a weighing table pivotally supported upon said pair of primary main levers, a pair of similar and opposed pivotally mounted secondary main weighing levers pivotally supporting near their outer ends the inner ends of said primary main weighing levers, and weighing means operatively connected to the inner ends of said pair of secondary main weighing levers, and comprising a single primary intermediate lever, disposed at an angle to the pivot lines of said primary and secondary main levers, and a single secondary intermediate lever, disposed at a right angle to the pivot lines of said primary and secondary main levers, and at an acute angle to said primary intermediate lever.

2. In a testing machine, a pair of pivotally mounted primary main weighing levers, a weighing table pivotally supported upon said pair of primary main weighing levers, a pair of pivotally mounted secondary main weighing levers operatively connected with said primary main weighing levers, a pivotally mounted intermediate lever operatively connected with each of said pair of secondary main levers, and weighing means operatively connected with said intermediate lever.

3. In a testing machine, a pair of pivotally mounted primary main weighing levers, a weighing table pivotally supported upon said pair of primary main weighing levers, a pair of pivotally mounted secondary main weighing levers operatively connected with said primary main weighing levers, a pivotally mounted intermediate lever connected with each of said secondary main weighing levers through a universal pivotal connection, and weighing means operatively connected with said intermediate lever.

4. In a testing machine, a pair of pivotally mounted primary main weighing levers, a weighing table pivotally supported upon said pair of primary main weighing levers, a pair of pivotally mounted secondary main weighing levers operatively connected with said primary main weighing levers; said pairs of primary and secondary main levers extending from opposite sides of the weighing table towards the center of thrust thereof, a pivotally mounted intermediate lever operatively connected with each of said pair of secondary main levers, and weighing means operatively connected with said intermediate lever.

5. In a testing machine, a pair of pivotally mounted primary main weighing levers, a weighing table pivotally supported upon said pair of primary main weighing levers, a pair of pivotally mounted secondary main weighing levers operatively connected with said primary main weighing levers, a pivotally mounted intermediate lever, the levers of each of said pairs of main weighing levers being of equal length and extending from opposite sides of the weighing table towards the center of thrust thereof, and weighing means operatively connected with said intermediate lever.

6. In a testing machine, a plurality of similar opposed pivotally mounted main weighing levers, a weighing table pivotally supported upon said main weighing levers, a single pivotally mounted primary intermediate lever at an inclined relation to the pivotal lines of said main weighing levers and operatively connected therewith through universal pivotal connections, a single secondary intermediate lever disposed at a right angle to the pivot lines of said main weighing levers, and at an acute angle to said primary intermediate lever, and weighing means operatively connected with said secondary intermediate lever.

7. In a testing machine, a plurality of similar opposed pivotally mounted main weighing levers, a weighing table pivotally supported upon said main weighing levers, a single pivotally mounted primary intermediate lever at an inclined relation to the pivotal lines of said main weighing levers and operatively connected therewith through universal pivotal connections, a pivotally mounted secondary intermediate lever disposed at a right angle to the pivot lines of said main weighing levers and at an acute angle to said primary intermediate lever operatively connected with said primary intermediate lever, and weighing means operatively connected with said secondary intermediate lever.

8. In a testing machine, a pair of similar pivotally mounted primary main weighing levers, a weighing table pivotally supported upon said primary main levers, a pair of similar pivotally mounted secondary main levers operatively connected with said primary main levers, a single primary intermediate lever angularly disposed with respect to said main levers and operatively connected with each of said pair of secondary main levers, a pivotally mounted secondary intermediate lever operatively connected with said primary intermediate lever, and weighing means operatively connected with said secondary intermediate lever.

9. In a testing machine, a weighing platform, a pair of similar and opposed primary main levers extending inwardly at opposite directions towards each other and towards the center of load of the table, a pair of similar and opposed secondary main levers which carry the inner ends of said primary main levers, a single primary intermediate lever disposed at an acute angle to the pivot lines of said primary and secondary main levers, and carrying each of the inner ends of said pair of secondary main levers, a universal joint for said primary intermediate lever having its vertical center line coincident with the vertical center line of the platform, a single secondary intermediate lever disposed at a right angle to the pivot lines of said primary and secondary main levers and at an acute angle to said primary intermediate lever, and a universal suspension joint common to said single secondary intermediate lever, and said primary intermediate lever.

WILLIAM C. MORAN.